US008483696B2

(12) United States Patent
Tanigawa et al.

(10) Patent No.: US 8,483,696 B2
(45) Date of Patent: Jul. 9, 2013

(54) MOBILE COMMUNICATIONS SYSTEM, MOBILE STATION DEVICE, BASE STATION DEVICE AND CHANNEL ALLOCATION METHOD

(75) Inventors: Hironobu Tanigawa, Tokyo (JP); Yasuhiro Nakamura, Kanagawa (JP); Nobuaki Takamatsu, Kanagawa (JP)

(73) Assignee: Kyocera Corporation, Kyoto (JP)

( * ) Notice: Subject to any disclaimer, the term of this patent is extended or adjusted under 35 U.S.C. 154(b) by 941 days.

(21) Appl. No.: 12/441,374

(22) PCT Filed: Aug. 28, 2007

(86) PCT No.: PCT/JP2007/066631
§ 371 (c)(1),
(2), (4) Date: Jun. 8, 2009

(87) PCT Pub. No.: WO2008/032561
PCT Pub. Date: Mar. 20, 2008

(65) Prior Publication Data
US 2010/0046446 A1 Feb. 25, 2010

(30) Foreign Application Priority Data
Sep. 13, 2006 (JP) .................................. 2006-247756

(51) Int. Cl.
*H04W 72/00* (2009.01)
(52) U.S. Cl.
USPC ........ 455/450; 455/412; 455/452.1; 455/509; 455/432.1; 455/438; 370/232; 370/330; 370/338; 370/329; 370/401
(58) Field of Classification Search
USPC .................. 455/512, 452.1, 450, 509, 432.1, 455/438, 453, 403, 414.4, 452, 522, 517; 370/330, 329, 337, 458, 336, 241, 232, 338, 370/401
See application file for complete search history.

(56) References Cited

U.S. PATENT DOCUMENTS 5,666,655 A * 9/1997 Ishikawa et al. .............. 455/512
6,031,827 A * 2/2000 Rikkinen et al. .............. 370/330
(Continued)

FOREIGN PATENT DOCUMENTS

JP 10-190621 7/1998
JP 2004-032210 1/2004
(Continued)

OTHER PUBLICATIONS

International Search Report for PCT/JP2007/066631, mailed on Oct. 23, 2007, 1 page.

*Primary Examiner* — Joseph Arevalo
(74) *Attorney, Agent, or Firm* — Duane Morris LLP

(57) ABSTRACT

Each mobile station device (12) includes: a subchannel allocation refusal determining section (50), which determines a subchannel refused to be allocated from a base station device (10), based on a communication quality measured for each subchannel by a communication quality measuring section (44); an RMAP creating section (52), which creates refused channel information (RMAP information) indicating the subchannel determined to be refused to be allocated; and a transmitting section (54) which gives notice of the created RMAP information to the base station device (10). The base station device (10) includes: an RMAP acquiring section (26), which acquires the RMAP information noticed from the each mobile station device (12); and a subchannel allocating section (32), which determines whether to change a subchannel to be allocated to the each mobile station device (12), based on the acquired RMAP information and allocated channel information (MAP information) indicating the subchannel allocated to the each mobile station device (12).

5 Claims, 7 Drawing Sheets

U.S. PATENT DOCUMENTS

| | | | |
|---|---|---|---|
| 6,788,659 B1* | 9/2004 | Sato | 370/329 |
| 6,842,618 B2* | 1/2005 | Zhang | 455/452.1 |
| 6,993,343 B2* | 1/2006 | Yoshii et al. | 455/452.1 |
| 7,328,013 B2* | 2/2008 | Vialen et al. | 455/432.1 |
| 7,366,143 B2* | 4/2008 | Akatsuka et al. | 370/336 |
| 8,009,623 B2* | 8/2011 | Higuchi et al. | 370/329 |
| 8,036,673 B2* | 10/2011 | Moritomo et al. | 455/450 |
| 2004/0082333 A1* | 4/2004 | Ito et al. | 455/450 |
| 2004/0264421 A1* | 12/2004 | Sato et al. | 370/337 |
| 2005/0020272 A1* | 1/2005 | Barve | 455/450 |
| 2005/0075110 A1* | 4/2005 | Posti et al. | 455/452.1 |
| 2005/0111479 A1* | 5/2005 | Akatsuka et al. | 370/458 |
| 2005/0215241 A1* | 9/2005 | Okada | 455/414.1 |
| 2006/0052122 A1* | 3/2006 | Matsui et al. | 455/509 |
| 2006/0135194 A1* | 6/2006 | Rensburg et al. | 455/522 |
| 2006/0203765 A1* | 9/2006 | Laroia et al. | 370/328 |
| 2007/0010255 A1* | 1/2007 | Liu et al. | 455/450 |
| 2007/0026805 A1* | 2/2007 | Ishida | 455/63.1 |
| 2009/0271680 A1* | 10/2009 | Tanigawa et al. | 714/748 |
| 2009/0323608 A1* | 12/2009 | Adachi et al. | 370/329 |
| 2010/0009684 A1* | 1/2010 | Du | 455/438 |
| 2010/0214928 A1* | 8/2010 | Nogami et al. | 370/241 |
| 2011/0310862 A9* | 12/2011 | Doyle et al. | 370/338 |

FOREIGN PATENT DOCUMENTS

| | | |
|---|---|---|
| JP | 2005-520443 | 7/2005 |
| WO | WO-99/31823 | 6/1999 |

* cited by examiner

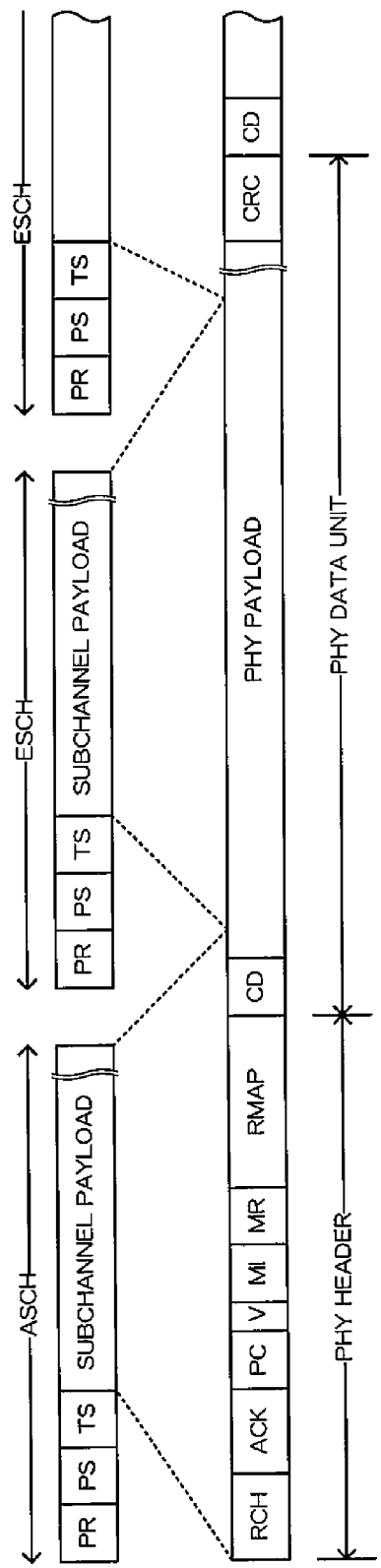

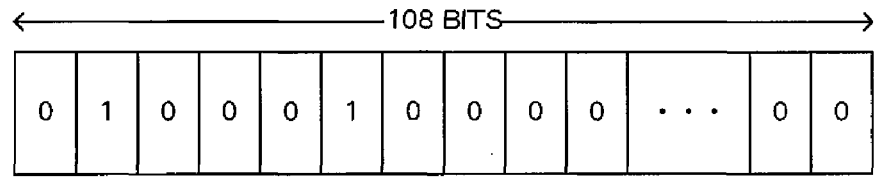
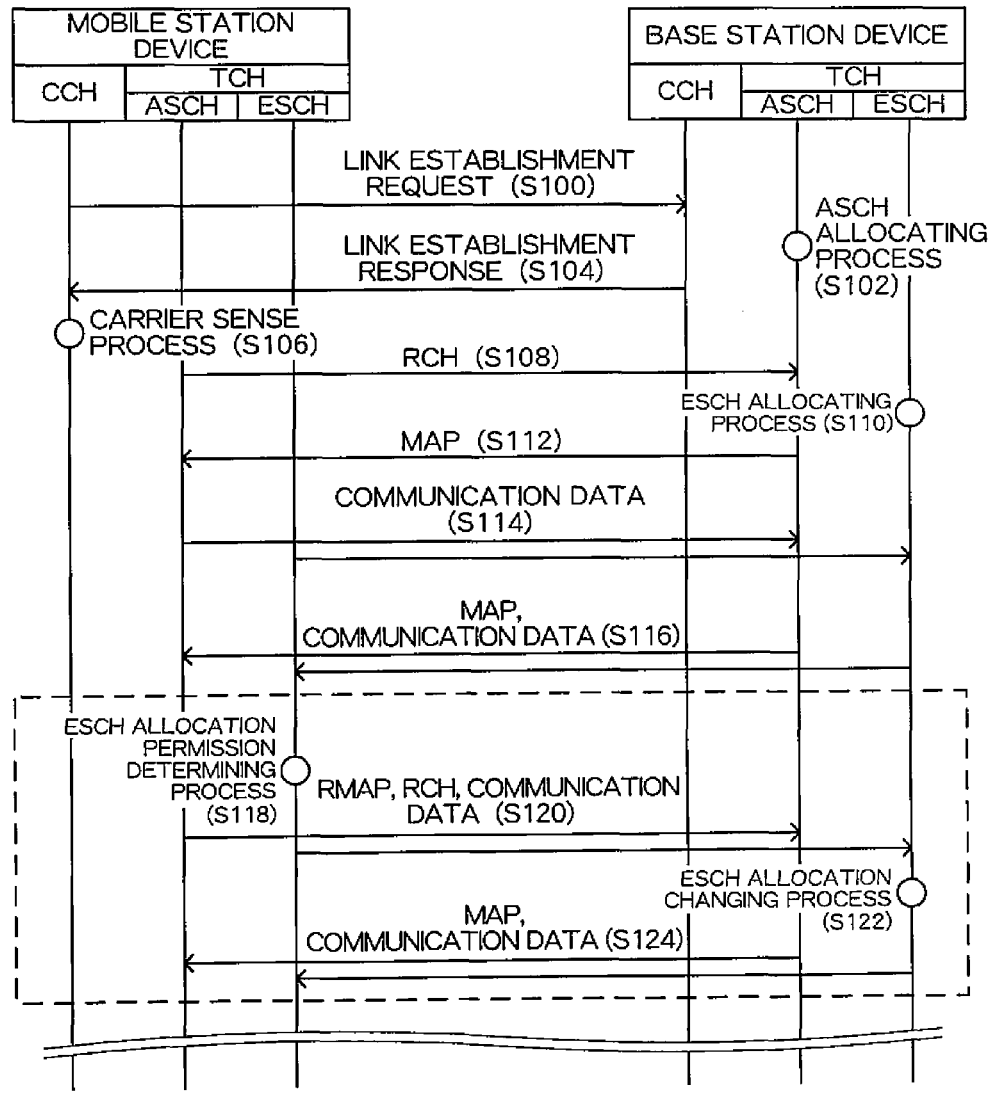

MOBILE COMMUNICATIONS SYSTEM, MOBILE STATION DEVICE, BASE STATION DEVICE AND CHANNEL ALLOCATION METHOD

CROSS-REFERENCE TO RELATED APPLICATIONS

This application is a U.S. National Phase of International Patent Application No. PCT/JP2007/066631 filed Aug. 28, 2007, which claims priority to Japanese Patent Application No. 2006-247756 filed Sep. 13, 2006, the disclosures of which are herein incorporated by reference in their entirety.

TECHNICAL FIELD

The present invention relates to a mobile communications system, a base station device, a mobile station device, and a channel allocation method, and more particularly, to a mobile communications system, a base station device, a mobile station device, and a channel allocation method, which change allocation of channels during communication.

BACKGROUND ART

A multichannel communication system is a system for performing data transmission at a high rate via a plurality of traffic channels. In a mobile communications system employing the system, each of a plurality of mobile station devices performs communication with a base station device via the plurality of traffic channels which are designated by the base station device.

For example, a WiMAX (registered trademark) is one of the multichannel communication systems in which an orthogonal frequency division multiple access (OFDMA) system and a time division duplex (TDD) system are combined in together, and each communication channel (called "subchannel") according to that communication system is defined by the combination of a given number of consecutive subcarriers and a time slot.

In the mobile communications system employing the WiMAX, the subchannel used by each of the mobile station devices is designated by MAP information noticed by the base station device for each of TDD frames. The MAP information is a bit string indicative of a plurality of subchannels used in a subsequent TDD frame for which notice of the MAP information has been given. For that reason, the subchannel allocated to the mobile station device may flexibly be changed even during communication by merely changing the MAP information.

Also, the following Patent Document 1 discloses a technology by which the allocation of radio resources (communication channels) to the respective users is flexibly and dynamically controlled based on the necessity of a change of data transmission, or the like, in a base station subsystem.
Patent Document 1: JP 10-190621 A

DISCLOSURE OF THE INVENTION

Problems to be Solved by the Invention

However, in the conventional mobile communications system employing the multichannel communication system, it is impossible for the mobile station device to refuse accepting the traffic channel noticed by the base station device, or to give notice of an acceptable traffic channel to the base station device.

For example, the mobile station device may not change the number of traffic channels to be used according to an increase or decrease of transmission data. Also, the mobile station device may not refuse to allocate a traffic channel degraded in quality, or request the allocation of a new traffic channel, even if a radio wave propagation state of downlink (direction from the base station device toward the mobile station device) is deteriorated. For that reason, in order to prevent a radio wave interference on the mobile station device side, solving means such that a cell design is devised may be required.

In the conventional personal handy-phone system (PHS), the mobile station device implements carrier sense (interference signal measurement) on the traffic channel designated by the base station device, and determines whether or not the channel is accepted, based on the measurement result. However, it is distant that the same method is applied to the mobile communications system using the multichannel communication system. The reason is because, in that system, a plurality of traffic channels are allocated to one mobile station device, and hence, when carrier sense is executed on each of the traffic channels, it requests a tremendously long period of time to perform the channel allocation processing when a connection starts or when a channel changes.

The present invention has been made in view of the above-mentioned conventional problems, and therefore an object of the present invention is to provide a mobile communication system, a base station device, a mobile station device, and a channel allocation method, which are capable of appropriately changing a traffic channel allocated to the mobile station device according to a communication state on the mobile station device side.

Means for Solving the Problems

In order to achieve the above-mentioned object, a mobile communications system according to the present invention includes: a base station device; and a plurality of mobile station devices. The base station device includes channel allocating means for determining, among a plurality of traffic channels, at least some of the traffic channels allocated to each of the mobile station devices, and gives notice of allocated channel information indicative of the traffic channels determined by the channel allocating means to the each of the mobile station devices. The each of the mobile station devices performs communication with the base station device via the traffic channels indicated by the allocated channel information. The each of the mobile station devices includes: channel allocation refusal determining means for determining a traffic channel refused to be allocated from the base station device among the plurality of traffic channels based on information indicative of a state of communication with the base station device; and refused channel information notice means for giving notice of refused channel information indicative of the traffic channel refused to be allocated from the base station device among the plurality of traffic channels to the base station device. The channel allocating means determines whether or not the traffic channels allocated to the each of the mobile station devices are changed, based on the refused channel information noticed from the each of the mobile station devices and the allocated channel information noticed to the each of the mobile station devices.

According to the present invention, the mobile station device determines the traffic channel refused to be allocated from the base station device according to the state of communication with the base station device, and gives the notice of the refused channel information including the traffic channel determined to be refused to be allocated, to the base station device. The base station device determines whether or not the traffic channels allocated to the mobile station device are changed, based on the refused channel information noticed from the mobile station device and the allocated channel information noticed to the mobile station device. For that reason, the traffic channel that is allocated to the mobile station device may appropriately be changed according to the communication state of the mobile station device side.

Further, the information indicative of the state of communication with the base station device may include a communication quality related to each of the plurality of traffic channels. With the above-mentioned configuration, the traffic channel that is allocated to the mobile station device may be changed based on the communication quality of the each of the plurality of traffic channels which is measured by the mobile station device.

Further, the information indicative of the state of communication with the base station device may include at least a volume of data transmitted to the base station device. The refused channel information notice means may further give notice of transmission data volume information indicative of the volume of data transmitted to the base station device, to the base station device. The channel allocating means may determine whether or not the traffic channels allocated to the each of the mobile station devices are changed, further based on the transmission data volume information noticed from the each of the mobile station devices and the volume of data transmitted to the each of the mobile station devices. With the above-mentioned configuration, for example, in the mobile communications system employing a communication method with the same transmission band between uplink and downlink, there is no disadvantage that the transmission band (number of traffic channels) from the base station device to the mobile station device is changed based on only the transmission data volume from the mobile station device to the base station device.

Further, a mobile station device according to the present invention communicates with a base station device via, among a plurality of traffic channels, at least some of the traffic channels noticed from the base station device. The mobile station device includes: channel allocation refusal determining means for determining a traffic channel refused to be allocated from the base station device among the plurality of traffic channels based on information indicative of a state of communication with the base station device; and refused channel information notice means for giving notice of refused channel information indicative of the traffic channel refused to be allocated from the base station device among the plurality of traffic channels to the base station device.

Further, a base station device according to the present invention includes channel allocating means for determining, among a plurality of traffic channels, at least some of the traffic channels allocated to each of a plurality of mobile station devices, and gives notice of allocated channel information indicative of the traffic channels determined by the channel allocating means to the each of the mobile station devices. The channel allocating means determines whether or not the traffic channels allocated to the each of the mobile station devices are changed, based on refused channel information indicative of a traffic channel refused to be allocated by the each of the mobile station devices among the plurality of traffic channels noticed from the each of the mobile station devices, and the allocated channel information noticed to the each of the mobile station devices.

Further, a channel allocation method according to the present invention is for a mobile communications system including: a base station device; and a plurality of mobile station devices. The base station device performs a channel allocating step of determining, among a plurality of traffic channels, at least some of the traffic channels allocated to each of the mobile station devices, and gives notice of allocated channel information indicative of the traffic channels determined in the channel allocating step to the each of the mobile station devices. The each of the mobile station devices performs communication with the base station device via the traffic channels indicated by the allocated channel information. The each of the mobile station devices performs: a channel allocation refusal determining step of determining a traffic channel refused to be allocated from the base station device among the plurality of traffic channels based on information indicative of a state of communication with the base station device; and a refused channel information notice step of giving notice of refused channel information indicative of the traffic channel refused to be allocated from the base station device among the plurality of traffic channels to the base station device. In the channel allocating step, whether or not the traffic channels allocated to the each of the mobile station devices are changed is determined based on the refused channel information noticed from the each of the mobile station devices and the allocated channel information noticed to the each of the mobile station devices.

BRIEF DESCRIPTION OF THE DRAWINGS

FIG. 4 is a diagram illustrating an example of a PHY frame structure in an uplink.

FIG. 5 is a diagram illustrating an example of RMAP information (refused channel information).

FIG. 6 is a sequence diagram illustrating a series of processing related to communication between the base station device and the mobile station device.

BEST MODE FOR CARRYING OUT THE INVENTION

Hereinafter, an embodiment of the present invention is described in detail with reference to the drawings.

Figure 1:
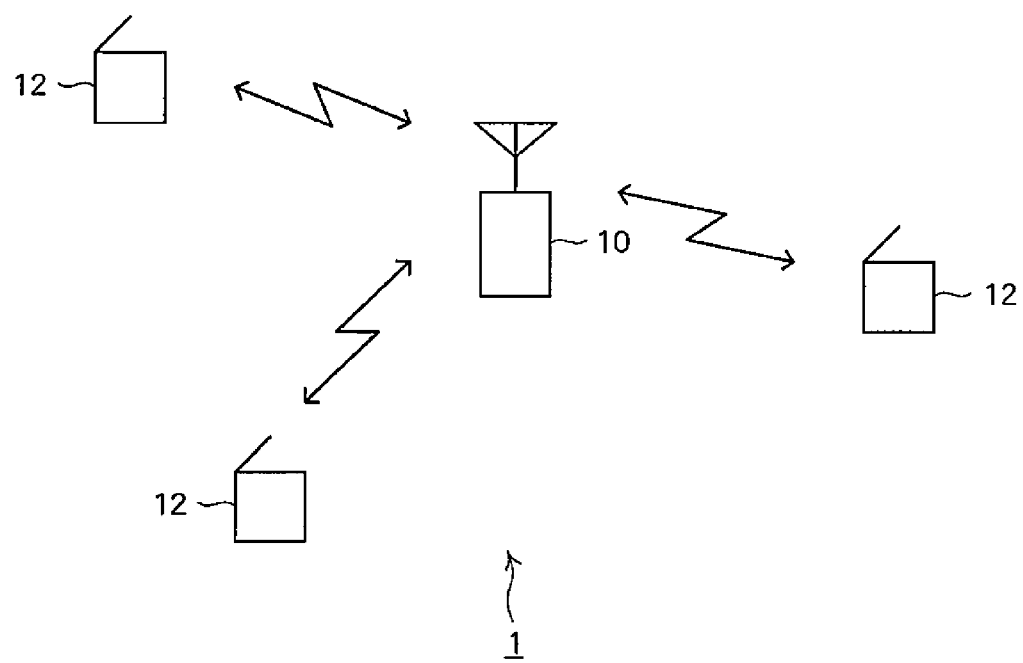
FIG. 1 is an overall configuration diagram of a mobile communications system according to an embodiment of the present invention.

FIG. 1 is an overall configuration diagram of a mobile communications system according to the embodiment of the present invention. As illustrated in the figure, a mobile communications system 1 includes a base station device 10 and a plurality of mobile station devices 12 (three in this embodiment).

Each of the mobile station devices 12 conducts a radio communication with the base station device 10, and is, for example, a portable cellular phone or a personal digital assistant. In this embodiment, the mobile station device 12 transmits and receives data to and from the base station device 10 through a TDD system, and also conducts a multiplex communication through a TDMA system and an OFDMA system. Further, the base station device 10 includes an adaptive array antenna as described later, and performs the multiplex communication with each of the plurality of mobile station devices 12 through a space division multiple access (SDMA) system at the same time slot and the same carrier frequency by using this adaptive array antenna. In this way, the base station device 10 communicates with the plurality of mobile station devices 12 with the extremely high frequency use efficiency.

Figure 3:
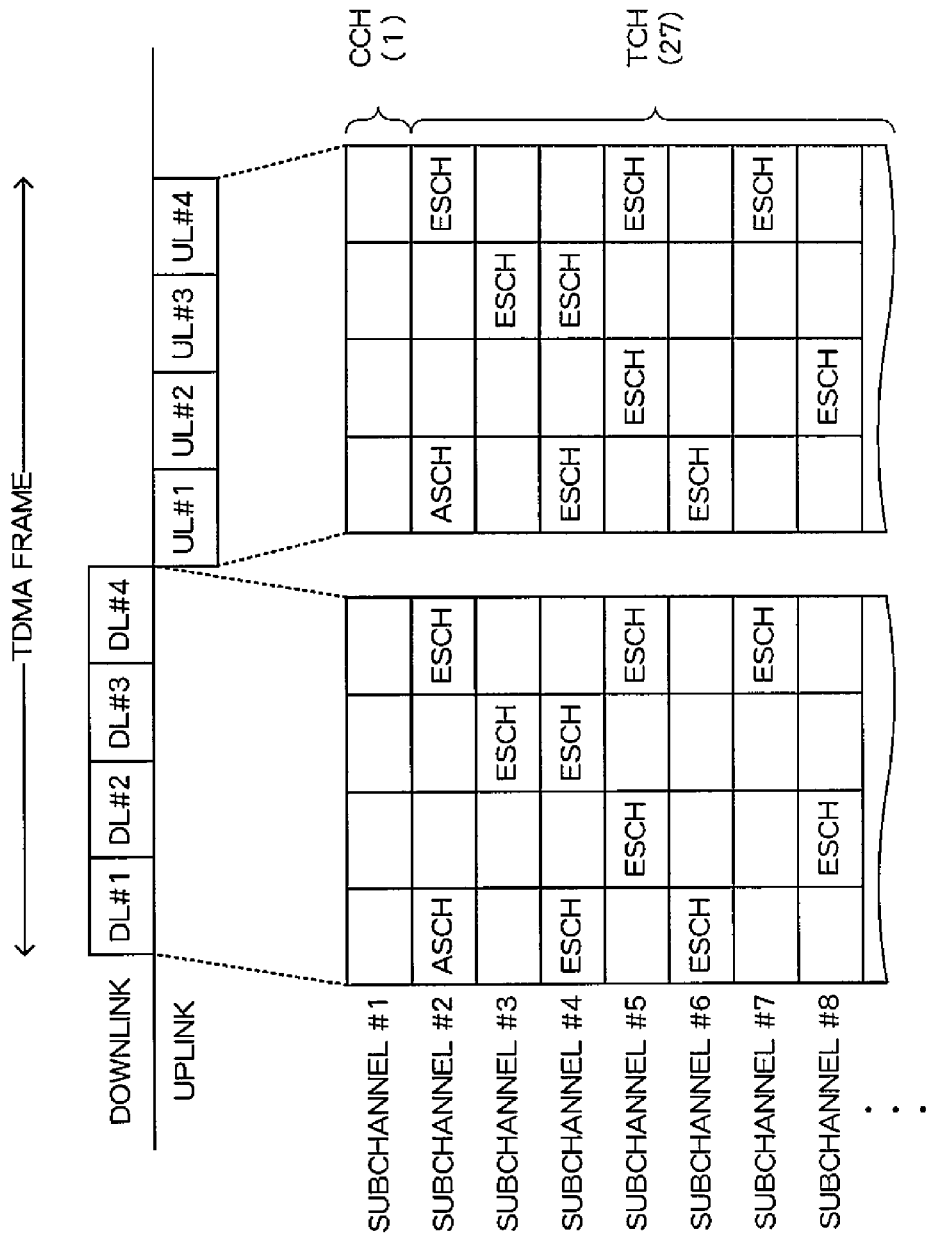
FIG. 3 is a diagram illustrating an example of a time slot structure due to a TDMA/TDD and a subchannel structure due to an OFDMA.

FIG. 3 is a diagram illustrating an example of a time slot structure (for one TDMA frame) due to the TDMA/TDD, and a subchannel structure due to the OFDMA. As illustrated in the figure, a downlink (radio transmission path directed from the base station device 10 toward the mobile station devices 12) and an uplink (radio transmission path directed from the mobile station device 12 toward the base station device 10) are each made up of four time slots. Also, each of the time slots is made up of 28 subchannels, and one of those subchannels is used as a control channel (CCH), and the remaining 27 subchannels are used as traffic channels (TCH).

The base station device 10 allocates at least some of 108 subchannels in total (27 subchannels×4 slots) which are used as the traffic channels to the respective mobile station devices 12 in each of the downlink and the uplink. Specifically, as illustrated in FIG. 3, the base station device 10 allocates one anchor subchannel (ASCH) and one or a plurality of extra subchannels (ESCH), which are described later, to the respective mobile station devices 12. Each of the mobile station devices 12 conducts communication with the base station device 10 via the plurality of subchannels allocated by the base station device 10. As illustrated in the figure, the ASCH and the ESCH are symmetrically allocated to the downlink slots and the uplink slots (DL#1 and UL#1, DL#2 and UL#2, . . . ) having slot numbers corresponding to each other. Also, there is a case in which the number of allocated ESCHs becomes 0 at a certain time point, taking quality of service (QoS) and so on into consideration.

A description is given of a process of allocating one ASCH and one or a plurality of ESCHs to the respective mobile station devices 12 by the base station device 10.

FIG. 6 is a sequence diagram illustrating a series of processing related to communication between the base station device 10 and the mobile station device 12. In starting communication, the mobile station device 12 transmits a link establishment request to the base station device 10 via the control channel (CCH) illustrated in FIG. 3 (S100). The base station device 10 selects one ASCH that is allocated to the mobile station device 12 in response to the link establishment request from the mobile station device 12 (S102). The ASCH is a subchannel used for notice of MAP information (allocated subchannel information) indicative of one or a plurality of ESCHs which are allocated to the mobile station devices 12 in a subsequent TDMA frame as described later, and hence it is desirable that a transmission error rate is low. For that reason, the base station device 10 selects a subchannel which is smallest in interference signal, that is, most excellent in communication quality among idle subchannels as the ASCH based on the carrier sense result. The base station device 10 implements carrier sense in the idle subchannel not used for communication as occasion demands, and updates the measurement results.

Then, the base station device 10 transmits a link establishment response including a slot number and a subchannel number which are indicative of the ASCH selected in S102 to the mobile station device 12 via the CCH (S104). Upon receiving the link establishment response, the mobile station device 12 implements carrier sense in the subchannel specified by the slot number and the subchannel number which are included in the link establishment response (S106). As a result of the carrier sense, when the mobile station device 12 determines that this subchannel has a communication quality necessary for the ASCH, the mobile station device 12 transmits ranging channel (RCH) information requesting the allocation of the ESCH to the base station device 10 via the ASCH so as to accept the allocation of the ASCH (S108). The RCH information is information indicative of the number of ESCHs (107 subchannels at maximum) whose allocation is desired by the mobile station device 12. On the other hand, as a result of the carrier sense in S106, when the mobile station device 12 determines that the subchannel noticed in S104 has no communication quality necessary for the ASCH, the mobile station device 12 again transmits the link establishment request via the CCH so as to refuse the allocation of the ASCH (S100).

The base station device 10 selects the ESCH that is allocated to the mobile station device 12 according to the RCH information noticed from the mobile station device 12 (S110). Specifically, the base station device 10 selects the ESCHs of the number indicated by the RCH information from the idle subchannels each having a given communication quality based on the carrier sense result.

When the base station device 10 selects one or a plurality of ESCHs which are allocated to the mobile station device 12, the base station device 10 transmits the MAP information indicative of the ESCH to the mobile station device 12 via the ASCH (S112). The MAP information is a bit string made up of 108 bits indicative of one or a plurality of ESCHs used in a subsequent TDMA frame (subsequent uplink frame and downlink frame) in which the MAP information has been received. Specifically, in the subsequent TDMA frame, a bit corresponding to the ESCH that is allocated to the mobile station device 12 is indicated by "1", and bits corresponding to other subchannels (ASCH, ESCHs allocated to other mobile station devices 12, and idle subchannel) are indicated by "0".

The mobile station device 12 transmits and receives data in the subsequent TDMA frame, that is, in the uplink (S114) and the downlink (S116) via the ASCH noticed in S104 and one or a plurality of ESCHs which are specified by the MAP information noticed in S112. A processing sequence subsequent to S116 is described later.

In this way, in the mobile communications system 1, an idle subchannel highest in communication quality in the base station device 10 is allocated as the ASCH at the time of starting the communication, and subsequently the ASCH is maintained until the communication is completed. On the other hand, the MAP information transmitted from the base station device 10 via the ASCH for every TDMA frame is indicative of one or a plurality of ESCHs used for communication in the subsequent TDMA frame, and hence the MAP information is updated, thereby making it possible to change the allocated ESCH for every TDMA frame. There is a case in which the base station device 10 sets the number of ESCHs allocated at a certain time to 0, taking QoS and so on into consideration.

Then, a description is given of the structure of data transmitted to the base station device 10 from the mobile station device 12. FIG. 4 is a diagram illustrating an example of a physical layer (PHY) frame structure in the uplink. Data for one PHY frame is transmitted in one TDMA frame. Specifically, one PHY frame is distributed to each subchannel (SCH) payload related to one ASCH and one or a plurality of ESCHs in each TDMA frame, and transmitted. As illustrated in FIG. 4, the PHY frame is made up of a PHY header including RCH, V, and RMAP, and a plurality of PHY data units including a PHY payload and so on. In this embodiment, the RCH is a region in which the RCH information indicative of the number of ESCHs whose allocation is desired by the mobile station device 12 is stored. The V is a region in which V bits (for example, a bit string of 7 bits) indicative of the number of subchannels including the PHY data in the uplink are stored, and when there is no PHY data, "0" is stored in the region. The refuse MAP (RMAP) is a region in which the RMAP information (refused channel information) having the same size as that of the MAP information (allocated channel information) is stored. FIG. 5 is a diagram illustrating an example of the RMAP information. As illustrated in the figure, the RMAP information is a bit string made up of 108 bits indicative of the ESCH that is refused to be allocated from the base station device 10 in the subsequent TDMA frame, and indicates bits corresponding to the ESCH refused to be allocated by "1", and indicates other bits by "0".

One of the features in this embodiment resides in that the base station device 10 flexibly determines whether to change the ESCH to be allocated to the mobile station device 12 based on the RMAP information noticed from each of the mobile station devices 12. That is, the mobile station device 12 selects the ESCH refused to be allocated according to the communication quality in each of the ESCHs allocated from the base station device 10 and the volume of data that is transmitted to the base station device 10, and creates the RMAP information indicative of the selected ESCH. For example, in the RMAP information, bits corresponding to the ESCH having no given communication quality are set to "1". Alternatively, when the volume of data transmitted to the base station device 10 is reduced, only the ESCH necessary for transmission remains, and bits corresponding to other ESCHs are set to "1" so as to cancel the allocation of the other ESCHs. When notice of the RMAP information at least partially including "1" is given to the base station device 10, the base station device 10 determines whether to change (reduce) the ESCH allocated in the subsequent TDMA frame based on the MAP information transmitted in the previous TDMA frame (downlink) and the RMAP information noticed from the mobile station device 12 in the present TDMA frame (uplink). Then, new MAP information is created based on the result, and notice thereof is given to the mobile station device 12. In this way, it is possible to appropriately change the ESCH that is allocated to the mobile station device 12 according to the communication state of the mobile station device 12 side.

Hereinafter, a description is given of the configurations and operation of the base station device 10 and the mobile station device 12.

Figure 2:
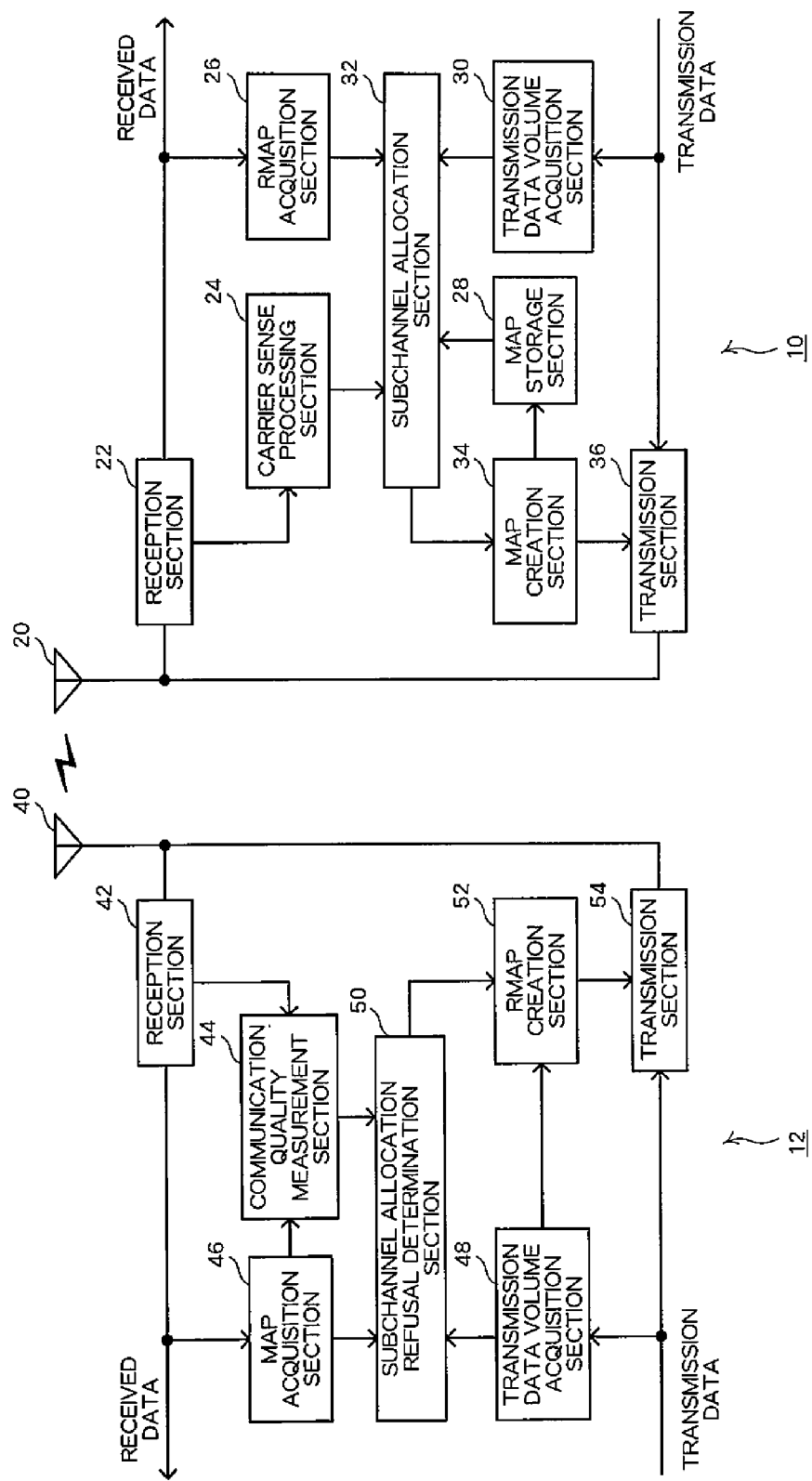
FIG. 2 is a functional block diagram of a base station device and a mobile station device according to the embodiment of the present invention.

FIG. 2 is a functional block diagram of the base station device 10 and the mobile station device 12. As illustrated in the figure, the base station device 10 includes an adaptive array antenna 20, a receiving section 22, a carrier sense processing section 24, an RMAP acquiring section 26, a MAP storage section 28, a transmission data volume acquiring section 30, a subchannel allocating section 32, a MAP creating section 34, and a transmitting section 36.

The adaptive array antenna 20 is an array of a plurality of antennas, and receives radio signals transmitted from the respective mobile station devices 12 by the respective antennas and outputs the received signals to the receiving section 22. Also, the adaptive array antenna 20 transmits signals input from the transmitting section 36 from the respective antennas. Receiving and transmitting are changed over by time division.

The receiving section 22 includes a low noise amplifier, a down converter, a space division processing section, a time division processing section, a symbol synchronizing section, an A/D converter, a fast Fourier transform (FFT) section, a channel estimating section, and a demapping section. The receiving section 22 separates and extracts the received data from the respective mobile station devices 12 from the radio signals received by the adaptive array antenna 20.

That is, the signal input from the adaptive array antenna 20 is subjected to space division multiplex (SDMA), time division multiplex (TDMA), and orthogonal frequency division multiplex (OFDMA), and hence the receiving section 22 amplifies and down-converts the input signal, and thereafter subjects the input signal to the space division processing and the time division processing related to the weight control of the adaptive array antenna 20. Then, the receiving section 22 conducts symbol synchronization and the removal of a guard interval (GI) signal on the separated signals to obtain a baseband OFDM signal. The receiving section 22 A/D-converts the baseband OFDM signal, and thereafter conducts the FFT in the FFT section to obtain the respective subcarrier components of the OFDM symbol. Then, after having conducted given channel estimate processing, the receiving section 22 combines the subcarrier components corresponding to the respective mobile station devices 12 together to generate the symbol string with reference to the allocation state of the subchannel by the subchannel allocating section 32. Further, the receiving section 22 decodes the symbol string to obtain the received data from the respective mobile station devices 12. Each received data thus obtained is output to the RMAP acquiring section 26 and an upper device (not shown).

The carrier sense processing section 24 conducts carrier sense in the idle subchannels not used for communication as needed. Specifically, the carrier sense processing section 24 acquires the signal received in the adaptive array antenna 20 through the receiving section 22, and measures a receive signal strength indication (RSSI) in each of the idle subchannels with reference to the allocation state of the subchannels by the subchannel allocating section 32. The RSSI in each of the idle subchannels is indicative of the strength of the interference signal in that subchannel, and the subchannel has more excellent communication quality as the value of the RSSI is smaller.

The RMAP acquiring section 26 acquires the RMAP information and so on from the received data from the respective mobile station devices 12 which is input from the receiving section 22, and outputs the RMAP information to the subchannel allocating section 32. That is, the received data from the respective mobile station devices 12 has a data structure complying with the PHY frame structure illustrated in FIG. 4, and the RMAP acquiring section 26 acquires the RMAP information, the V bit, the RCH information, etc., from the PHY header of each received data for every TDMA frame, and outputs the information to the subchannel allocating section 32.

The MAP storage section 28 stores therein the latest MAP information created by the MAP creating section 34 for each of the mobile station devices 12 that are during communication.

The transmission data volume acquiring section 30 acquires the volume of data which is transmitted to the respective mobile station devices 12 in the subsequent TDMA frame by the base station device 10 based on the transmission data that is input from the upper device (not shown).

The subchannel allocating section 32 selects one ASCH allocated to each of the mobile station devices 12 from the 108 subchannels in response to the link establishment request from each of the mobile station devices 12. That is, the subchannel allocating section 32 selects a subchannel that is highest in communication quality (smallest in RSSI) as the ASCH from the idle subchannels based on the result of the carrier sense implemented by the carrier sense processing section 24. The slot number and the subchannel number which are indicative of the ASCH thus selected are transmitted to the respective mobile station devices 12 from the transmitting section 36 via the CCH.

Also, in response to notice of the RCH information requesting the allocation of the ESCH from the respective mobile station devices 12, the subchannel allocating section 32 selects one or a plurality of ESCHs which are allocated to the mobile station devices 12 from the 107 subchannels except for the above-mentioned ASCH. Specifically, the subchannel allocating section 32 selects the subchannels of the number indicated by the RCH information as the ESCHs from the idle subchannels having a given communication quality (having RSSI lower than a given value) based on the result of the carrier sense by the carrier sense processing section 24. When the number of idle subchannels having the given communication quality does not reach the number indicated by the RCH information, the subchannel allocating section 32 selects only the subchannels of the allocatable number. The MAP information indicative of one or a plurality of ESCHs thus selected is transmitted to the respective mobile station devices 12 from the transmitting section 36 via the ASCH.

Upon receiving notice of the RMAP information indicative of the ESCH refused to be allocated from each of the mobile station devices 12, the subchannel allocating section 32 determines whether or not the ESCH that is allocated to the mobile station device 12 is changed based on the noticed RMAP information and the latest MAP information of the mobile station device 12 (MAP information noticed to the mobile station device 12 in the previous TDMA frame) which is stored in the MAP storage section 28.

As described above, the MAP information is a bit string of 108 bits indicating the ESCH used in the subsequent TDMA frame (subsequent uplink frame and subsequent downlink frame) by "1", and the RMAP information is a bit string of 108 bits indicating the ESCH whose allocation is refused by the mobile station device 12 by "1". Also, a correspondence relationship between the bits and the subchannels in the MAP information is identical with that in the RMAP information. For that reason, the subchannel allocating section 32 determines whether to cancel the allocation of the ESCH in which a corresponding bit of both bit strings of the MAP information and the RMAP information is "1" (ESCH that has been allocated once by the base station device 10, but whose allocation has been refused by the mobile station device 12) to the mobile station device 12. Essentially, the subchannel allocating section 32 reduces the ESCH that is allocated to the mobile station device 12 according to the RMAP information.

When the V bit input from the RMAP acquiring section 26 together with the RMAP information is "1", the subchannel allocating section 32 determines whether to change (reduce) the ESCH allocated to the mobile station device 12 further based on the transmission data volume acquired from the transmission data volume acquiring section 30 (volume of data transmitted to the mobile station device 12 in the subsequent TDMA frame). The case in which the V bit is "1" is a case in which the size of the PHY payload in the uplink is 0, and there is no data transmitted to the base station device 10 by the mobile station device 12. That is, when the V bit is "1", there is the possibility that the mobile station device 12 creates an RMAP information with the bit corresponding to the ESCH to be canceled as "1" so as to leave only the ESCH necessary for subsequent transmission, and cancel the allocation of other ESCHs, and gives notice of the RMAP information to the base station device 10. However, as illustrated in FIG. 3, the ESCH allocated by the subchannel allocating section 32 is used commonly to data transmission in the uplink and the downlink, that is, the uplink and the downlink have the same transmission band, and hence in this event, there is a case in which, when the number of ESCHs allocated to the mobile station device 12 is reduced according to only the RMAP information, the volume of data transmitted from the base station device 10 to the mobile station device 12 exceeds a transmission capacity (downlink transmission band) caused by the reduced number of ESCHs. Under the circumstances, when the V bit is "1", the subchannel allocating section 32 determines whether to reduce the allocated ESCHs based on not only the RMAP information but also the volume of data transmitted to the mobile station device 12 in the subsequent TDMA frame by the base station device 10. With the above-mentioned operation, in the mobile communications system in which the downlink and the uplink have the same transmission band, there is no disadvantage that not only the transmission band of the uplink but also the transmission band of the downlink is unavoidably reduced when only the communication data in the uplink is reduced. The V bit may be information indicative of the size of the PHY payload in the uplink (volume of data transmitted to the base station device 10 by the mobile station device 12).

The MAP creating section 34 creates the MAP information indicative of one or a plurality of ESCHs which are allocated to the respective mobile station devices 12 with the aid of the subchannel allocating section 32, and outputs the MAP information to the transmitting section 36. Specifically, the MAP creating section 34 creates, as the MAP information, the bit string of 108 bits in which the bit corresponding to the ESCH allocated to the mobile station device 12 in the subsequent TDMA frame is set to "1" and other bits are set to "0" among the 108 subchannels. The created MAP information is also output to the MAP storage section 28, and stored for each of the mobile station devices 12 that are during communication.

The transmitting section 36 includes a symbol mapping section, an inverse fast Fourier transform (IFFT) section, a D/A converter, a time division multiplex processing section, a space division multiplex processing section, an up converter, and an amplifier. The transmitting section 36 shapes the transmission data to the respective mobile station devices 12 which is input from the upper device (not shown) into a given downlink PHY frame structure, and also generates a transmission signal corresponding to each shaped transmit data to output the transmission signal to the adaptive array antenna 20.

That is, the transmitting section 36 distributes the transmission data into a plurality of PHY payloads, and adds the PHY header including the MAP information which is input from the MAP creating section 34 to a PHY data unit resulting from combining those PHY payloads together to constitute a given PHY frame. Then, the transmitting section 36 divides data related to the PHY frame into a plurality of subchannel payloads related to one ASCH and one or a plurality of ESCHs in the present TDMA frame with reference to the allocation state of the subchannel by the subchannel allocating section 32, and generates the transmission data for every subchannel. In this situation, the data string including the MAP information is allocated to the subchannel payload related to the ASCH. Subsequently, the transmitting section 36 converts the generated transmission data of each subchannel into a symbol string by means of symbol mapping, and distributes the symbol string to each subcarrier of the subchannel. Then, the IFFT is conducted in the IFFT section, and D/A conversion is conducted to obtain a baseband OFDM signal. Further, the transmitting section 36 adds the guard interval signal to the baseband OFDM signal to generate a signal that has been subjected to a time division multiplexing process and a space division multiplexing process related to the weight control of the adaptive array antenna 20. Finally, the transmitting section 36 up-converts the generated signal into a radio signal, amplifies the radio signal up to a transmission power level, and supplies the amplified signal to the adaptive array antenna 20.

Subsequently, the respective functional blocks of the mobile station device 12 are described. As illustrated in FIG. 2, the mobile station device 12 includes an antenna 40, a receiving section 42, a communication quality measuring section 44, a MAP acquiring section 46, a transmission data volume acquiring section 48, a subchannel allocation refusal determining section 50, an RMAP creating section 52, and a transmitting section 54.

The receiving section 42 includes a low noise amplifier, a down converter, a symbol synchronizing section, an A/D converter, an FFT section, a channel estimating section, and a demapping section. The receiving section 22 acquires the received data from the base station device 10 from the radio signals received by the antenna 40. The acquired received data is output to the MAP acquiring section 46 and a upper layer (not shown). The processing contents in the receiving section 42 are substantially common to the processing contents in the receiving section 22 of the base station device 10 except for the space division processing and the time division processing, and therefore their detailed description is omitted.

The communication quality measuring section 44 measures the communication quality of each of 108 subchannels at maximum which are used as the traffic channels. Specifically, the communication quality measuring section 44 acquires a signal received in the antenna 40, and a desired signal from the base station device 10 in each of the ESCHs which are being used for communication (each of the ESCHs specified according to the MAP information of the previous TDMA frame which is acquired from the MAP acquiring section 46) from the receiving section 42 for every TDMA frame, and measures a signal to interference and noise ratio (SINR) related to each of the subchannels based on those signals. The mean value of the SINR related to each of 107 ESCHs at maximum except for the ASCH may be set as the communication quality of each subchannel. Also, a signal to noise ratio (SNR), a carrier to interference and noise ratio (CINR), a carrier to interference ratio (CIR), a carrier to noise ratio (CNR), a receive signal strength indication (RSSI), a communication rate which are for each of the subchannels, their mean values, and so on may be set as the communication quality of each subchannel.

The MAP acquiring section 46 acquires the MAP information from the received data from the base station device 10 which is input from the receiving section 42, and outputs the MAP information to the subchannel allocation refusal determining section 50.

The transmission data volume acquiring section 48 acquires the volume of data transmitted to the base station device 10 in the subsequent TDMA frame by the mobile station device 12 based on transmission data input from an external connection device (not shown) or a data input section (not shown).

The subchannel allocation refusal determining section 50 determines a subchannel that is refused to be allocated from the base station device 10 among the subchannels that may be allocated as the ESCH based on information indicative of a state of communication with base station device 10. Here, the information indicative of the state of communication with base station device 10 which is used for determination may be the communication quality of each subchannel. That is, the subchannel allocation refusal determining section 50 may acquire each of the subchannels (for example, mean value of the SINR) from the communication quality measuring section 44, determine whether or not each of the communication qualities is equal to or higher than a given quality and refuse the allocation of the subchannel whose communication quality is lower than the given quality as the ESCH.

Also, the information indicative of the state of communication with base station device 10 which is used for determination by the subchannel allocation refusal determining section 50 may be the volume of data transmitted to the base station device 10. For example, the subchannel allocation refusal determining section 50 acquires the volume of transmission data to the base station device 10 in the subsequent TDMA frame from the transmission data volume acquiring section 48, leaves only the ESCH necessary for transmitting data of that volume, and selects other ESCHs as the ESCHs that are refused (canceled) to be allocated. In this case, the selection between the ESCH refused to be allocated and the ESCH not refused to be allocated may be executed based on the communication quality of each ESCH.

The RMAP creating section 52 creates the RMAP information indicative of the subchannel whose allocation as the ESCH is determined to be refused by the subchannel allocation refusal determining section 50, and outputs the RMAP information to the transmitting section 54. Specifically, the RMAP creating section 52 creates, as the RMAP information, the bit string of 108 bits in which bits corresponding to the subchannel whose allocation as the ESCH is refused in the subsequent TDMA frame are set as "1", and other bits are set as "0" among 108 subchannels. Also, the RMAP creating section 52 may create the V bit (for example, bit string of 7 bits) indicative of the number of subchannels including the PHY data (transmission data) in the uplink. That is, the RMAP creating section 52 may create the V bit indicative of the number of subchannels including "0" in the case where the transmission data volume is 0, and the transmission data in other cases, based on the transmission data volume acquired from the transmission data volume acquiring section 48 (volume of data transmitted to the base station device 10 in the subsequent TDMA frame). Further, the RMAP creating section 52 determines whether or not the present uplink transmission band is sufficient, based on the transmission data volume, and creates the RCH information indicative of "0" when it is sufficient, and the number of ESCHs necessary for subsequent communication when it is not sufficient.

The transmitting section 54 includes a symbol mapping section, an IFFT section, a D/A converter, an up converter, and an amplifier. The transmitting section 54 shapes the transmission data to the base station device 10 which is input from the external connection device (not shown) or the data input section (not shown) into a given uplink PHY frame structure illustrated in FIG. 4, and also generates a transmission signal corresponding to each shaped transmission data to transmit the transmission signal from the antenna 40. The transmission data includes the RMAP information (refused channel information) created by the RMAP creating section 52, and hence the transmitting section 54 also functions as refused channel information notice means.

That is, the transmitting section 54 distributes the transmission data into a plurality of PHY payloads, and adds the PHY header including the RMAP information, the V bit, and the RCH information which are input from the RMAP creating section 52 to a PHY data unit resulting from combining those PHY payloads together to constitute a given PHY frame. Subsequently, data related to the PHY frame is divided into a plurality of subchannel payloads related to one ASCH, and one or a plurality of ESCHs in the present TDMA frame to generate the transmission data for each of the subchannels. In this situation, the data string including the RMAP information is allocated to the subchannel payload related to the ASCH. The other processing contents in the transmitting section 54 are substantially common to the processing contents in the transmitting section 36 of the base station device 10 except for the time division multiplexing process and the space division multiplexing process, and therefore their detailed description is omitted.

Now, a description is given of the processing of S116 to S124 in the sequence diagram of FIG. 6 (process of changing the allocation of the ESCH). The processing is repetitively executed until communication between the base station device 10 and the mobile station device 12 has been completed.

The mobile station device 12 receives the MAP information, the communication data, and so on which are transmitted from the base station device 10 via the ASCH noticed in S104 and one or a plurality of ESCHs specified by the MAP information noticed in S112 (S116). Then, the mobile station device 12 determines whether or not the allocation of each of one or a plurality of ESCHs specified by the received MAP information in the subsequent TDMA frame is accepted (S118). Then, the mobile station device 12 creates the RMAP information, the RCH information, and so on, based on the determination result in S118, and transmits the created information together with the communication data to the base station device 10 via the ASCH and one or a plurality of ESCHs specified by the MAP information noticed through the communication in S116 (S120). The ESCH allocation permission determining process in S118 is described later with reference to a flowchart of FIG. 7.

Upon receiving the RMAP information, the RCH information, the communication data, and so on, the base station device 10 determines whether or not the MAP information transmitted in S116 is changed, based on the received RMAP information, RCH information, and so on (S122). Then, the base station device 10 transmits the MAP information indicative of one or a plurality of ESCHs determined in S122 together with the communication data to the mobile station device 12 via the ASCH and the same ESCH as that in S120 (S124). The ESCH allocation changing process in S122 is described later with reference to a flowchart of FIG. 8.

Figure 7:
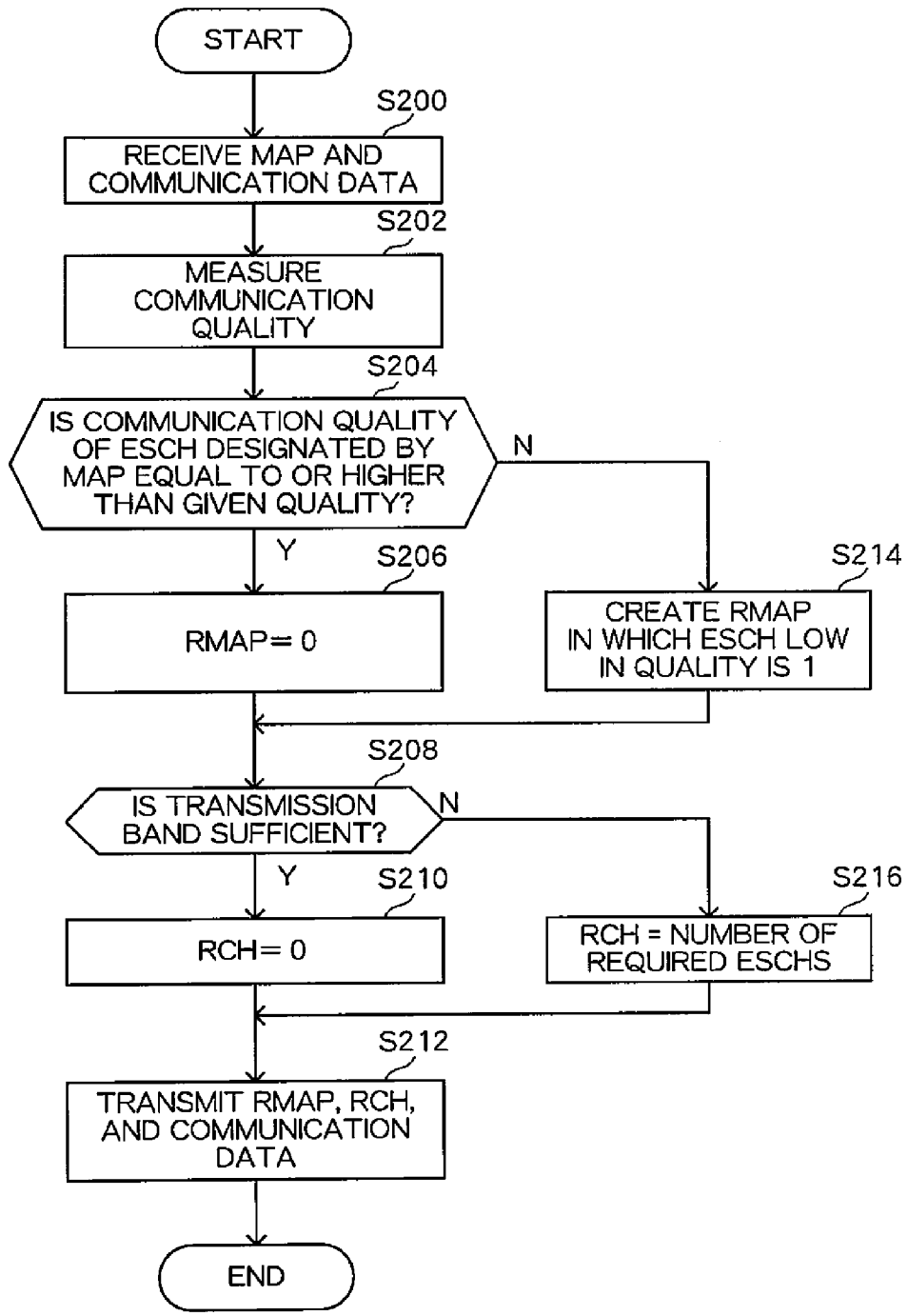
FIG. 7 is a flowchart illustrating an ESCH allocation permission determining process of the mobile station device.

Subsequently, a description is given of the ESCH allocation permission determining process (S118) of the mobile station device 12 illustrated in FIG. 6 with reference to the flowchart of FIG. 7.

When the receiving section 42 receives a signal including the MAP information, the communication data, and so on transmitted from the base station device 10 (S200), the MAP acquiring section 46 acquires the MAP information from the received data input from the receiving section 42, and outputs the MAP information to the subchannel allocation refusal determining section 50. Also, the communication quality measuring section 44 measures the communication quality (for example, mean value of the SINRs) related to each of the subchannels based on the received signal input from the receiving section 42 and a desired signal from the base station device 10 in each of the ESCHs which are being used for communication (S202).

Then, the subchannel allocation refusal determining section 50 acquires the latest MAP information indicative of the ESCH used in the subsequent TDMA frame from the MAP acquiring section 46, and determines whether or not the communication quality of each of one or a plurality of ESCHs specified by the MAP information, which is measured by the communication quality measuring section 44 is equal to or higher than a given quality (S204). In the case where all of ESCHs have the communication quality equal to or higher than the given quality, the subchannel refusal determination section 50 determines that there is no ESCH to be refused. In this case, the RMAP creating section 52 creates the RMAP information in which all of bits are "0" (S206). On the other hand, in the case where there is at least one ESCH whose communication quality is lower than the given quality in S204, the RMAP creating section 52 creates the RMAP information in which a bit corresponding to the ESCH is "1", and other bits are "0" (S214).

Besides, the RMAP creating section 52 determines whether or not the present uplink transmission band is sufficient based on the transmission data volume acquired from the transmission data volume acquiring section 48 (S208). When there is a sufficient transmission band, the RMAP creating section 52 creates the RCH information indicative of "0" (S210). On the other hand, when the transmission band is short, the RMAP creating section 52 creates the RCH information indicative of the number of ESCHs necessary for the subsequent communication (S216).

Finally, the transmitting section 54 constitutes transmission data including the RMAP information and the RCH information which have been created by the RMAP creating section 52, and transmits the transmission data to the base station device 10 (S212).

Figure 8:
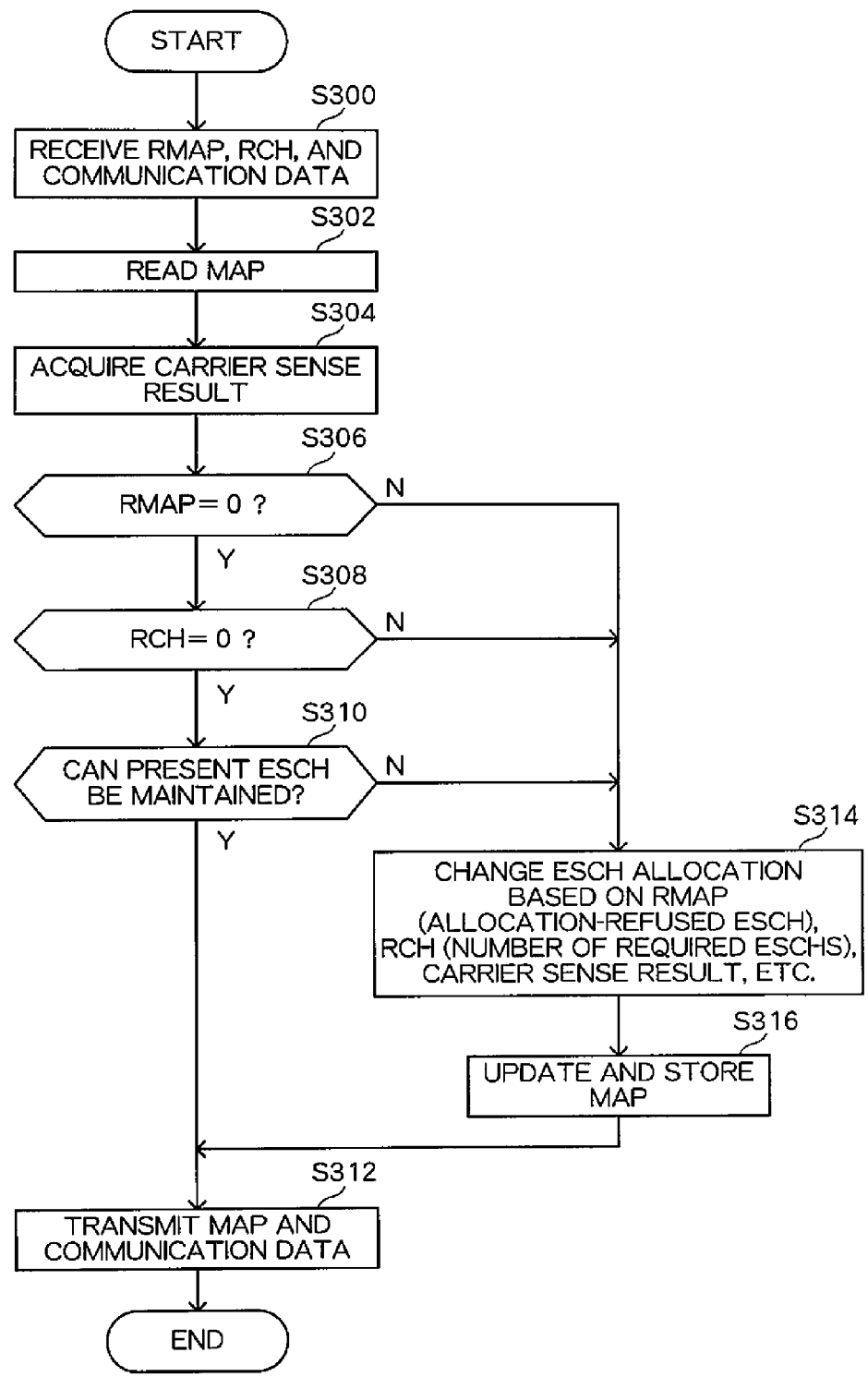
FIG. 8 is a flowchart illustrating an ESCH allocation changing process of the base station device.

Subsequently, a description is given of the ESCH allocation changing process (S122) of the base station device 10 illustrated in FIG. 6 with reference to the flowchart of FIG. 8.

When the receiving section 22 receives a signal including the RMAP information, the RCH information, the communication data, and so on which are transmitted from the mobile station device 12 (S300), the RMAP acquiring section 26 acquires the RMAP information, the RCH information, and so on from the received data input from the receiving section 22, and outputs the acquired information to the subchannel allocating section 32. Also, the subchannel allocating section 32 reads the MAP information noticed to the mobile station device 12 from the MAP storage section 28 (S302), and acquires the carrier sense result from the carrier sense processing section 24 (S304).

Subsequently, the subchannel allocating section 32 determines whether or not all of bits of the RMAP information input from the RMAP acquiring section 26 are "0" (S306). When all of the bits are "0", the subchannel allocating section 32 determines whether or not a value indicated by the RCH information input from the RMAP acquiring section 26 is "0". When the value is 0, the subchannel allocating section 32 determines whether or not the ESCH presently allocated may be maintained according to the carrier sense result acquired in S304 and the state of communication with another mobile station device 12 (S310). When the subchannel allocating section 32 determines that the present ESCH may be maintained, the MAP creating section 34 outputs the MAP information read in S302 to the transmitting section 36 without any change as it is.

When at least one bit of the RMAP information is "1" in S306, when a number indicated by the RCH information is "1" or more in S308, or when the subchannel allocating section 32 determines that the present ESCH may not be maintained in S310, the subchannel allocating section 32 changes the ESCH allocated to the mobile station device 12 based on the RMAP information indicative of the ESCH whose allocation is refused by the mobile station device 12, the RCH information indicative of the number of ESCHs required by the mobile station device 12, and the carrier sense result indicative of the strength of an interference signal in each of the idle subchannels. Then, the MAP creating section 34 creates the MAP information indicative of one or a plurality of ESCHs newly allocated by the subchannel allocating section 32, outputs the created MAP information to the transmitting section 36, and stores the created MAP information in the MAP storage section 28 (S316).

Finally, the transmitting section 36 constitutes transmission data including the MAP information input from the MAP creating section 34, and sends the transmission data to the mobile station device 12 (S312).

According to the above-mentioned embodiment, the traffic channel allocated to the mobile station device 12 may appropriately be changed according to the communication state of the mobile station device 12 side.

The present invention is not limited to the above-mentioned embodiment, but can implement various modifications. For example, in the description above, the present invention is applied to the mobile communications system using the OFDMA. Also, the present invention is applicable to a mobile communications system using another multichannel communication system.

Also, in the above-mentioned embodiment, the RMAP information is used as information for specifying the subchannel that is refused to be allocated (allocation permission channel information). On the contrary, the RMAP information may be used as information for specifying the subchannel whose allocation is positively required as the ESCH by the mobile station device 12 (allocation request channel information). For example, the realization is enabled by a regulation that "bits of "0" in the RMAP information correspond to the subchannel whose allocation is required as the ESCH by the mobile station device 12".

Also, it is needless to say that the allocated channel information, the permission channel information, the transmission data volume information, etc., in the present invention may be of a data format different from that of the MAP information, the RMAP information, the V bit, etc., in the above-mentioned embodiment.

The invention claimed is:

1. A mobile communications system, comprising:
as base station device; and
a plurality of mobile station devices,
wherein the base station device comprises channel allocating means for determining, among a plurality at traffic channels, at least some of the traffic channels allocated to each of the mobile station devices, and gives notice of allocated channel information indicative of the traffic channels determined by the channel allocating means to the each of the mobile station devices,
wherein the each of the mobile station devices performs communication with the base station device via the traffic channels indicated by the allocated channel information,
wherein the each of the mobile station devices comprises:
channel allocation refusal determining means for determining a traffic channel refused to be allocated to a communication with the base station device, from the base station device among the plurality of traffic channels based on information indicative of a state of communication with the base station device; and
refused channel information notice means for giving notice of refused channel information identifying the traffic channel refused to be allocated to the communication with the base station device, from the base station device among the plurality of traffic channels to the base station device, and
wherein the channel allocating means determines whether or not the traffic channels allocated to the each of the mobile station devices are changed, based on the refused channel information noticed from the each of the mobile station devices and the allocated channel information noticed to the each of the mobile station devices.

2. The mobile communications system according to claim 1, wherein the information indicative of the state of communication with the base station device, comprises a communication quality related to each of the plurality of traffic channels.

3. The mobile communications system according to claim 1,
wherein the information indicative of the state of communication with the base station device comprises at least a volume of data transmitted to the base station device,
wherein the refused channel information notice means further gives notice of transmission data volume information indicative of the volume of data transmitted to the base station device, to the base station device, and
wherein the channel allocating means determines whether or not the traffic channels allocated to the each of the mobile station devices are changed, further based on the transmission data volume information noticed from the each of the mobile station devices and the volume of data transmitted to the each of the mobile station devices.

4. A channel allocation method for a mobile communications system, comprising:
a channel allocating step of determining, among a plurality of traffic channels, at least some of the traffic channels allocated to each of a plurality of mobile station devices, and giving notice of allocated channel information indicative of the traffic channels determined, in the channel allocating step to the each of the mobile station devices; and
communicating, by each of the mobile station devices, with a base station device via the traffic channels indicated by the allocated channel information,
wherein the each of the mobile station devices is configured to perform:
a channel allocation refusal determining step of determining a traffic channel refused to be allocated to a communication with the base station device, from the base station device among the plurality of traffic channels based on information indicative of a state of communication with the base station device; and
a refused channel information notice step of giving notice of refused channel information identifying the traffic channel refused to be allocated to the communication with the base station device, from the base station device among the plurality of traffic channels to the base station device, and
wherein the channel allocating step determines whether or not the traffic channels allocated to the each of the mobile station devices are changed, based on the refused channel information noticed from the each of the mobile station devices and the allocated channel information noticed to the each of the mobile station devices.

5. The mobile communications system according to claim 2,
wherein the information indicative of the state of communication with the base station device composes at least a volume of data transmitted to the base station device,
wherein the refused channel information notice means further gives notice of transmission data volume information indicative of the volume of data transmitted to the base station device, to the base station device, and
wherein the channel allocating means determines whether or not the traffic channels allocated to the each of the mobile, station devices are changed, further based on the transmission data volume information noticed from the each of the mobile station devices and the volume of data transmitted to the each of the mobile station devices.

\* \* \* \* \*